(12) United States Patent
Rijskamp et al.

(10) Patent No.: US 10,561,266 B2
(45) Date of Patent: Feb. 18, 2020

(54) BREWING UNIT

(71) Applicant: KONINKLIJKE PHILIPS N.V., Eindhoven (NL)

(72) Inventors: Peter Rijskamp, Eindhoven (NL); Rodin Enne Bruinsma, Eindhoven (NL); Hendrikus Lodewijk Joseph Franciscus Holten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 352 days.

(21) Appl. No.: 15/517,342

(22) PCT Filed: Oct. 9, 2015

(86) PCT No.: PCT/EP2015/073439
§ 371 (c)(1),
(2) Date: Apr. 6, 2017

(87) PCT Pub. No.: WO2016/055633
PCT Pub. Date: Apr. 14, 2016

(65) Prior Publication Data
US 2017/0290459 A1 Oct. 12, 2017

(30) Foreign Application Priority Data
Oct. 10, 2014 (EP) .................................. 14188514

(51) Int. Cl.
*A47J 31/38* (2006.01)
*A47J 31/36* (2006.01)
(Continued)

(52) U.S. Cl.
CPC ........ *A47J 31/3628* (2013.01); *A47J 31/0668* (2013.01); *A47J 31/407* (2013.01)

(58) Field of Classification Search
CPC ........ A47J 31/06; A47J 31/0678; A47J 31/34; A47J 31/36; A47J 31/3638; A47J 31/3633; A47J 31/3628; A47J 31/3695
(Continued)

(56) References Cited

U.S. PATENT DOCUMENTS 8,720,320 B1    5/2014  Rivera
9,237,823 B2    1/2016  Ozanne
(Continued)

FOREIGN PATENT DOCUMENTS

CN    102438489 A    5/2012
CN    102892340 A    1/2013
(Continued)

OTHER PUBLICATIONS

English Translation and Notice of Allowance issued in connection with corresponding application No. 2017-517038 dated Aug. 25, 2017, 5 pages.
(Continued)

*Primary Examiner* — Dana Ross
*Assistant Examiner* — Ayub A Maye
(74) *Attorney, Agent, or Firm* — Schott, P.C.

(57) ABSTRACT

A brewing unit (100) for a beverage producing device (900) is disclosed. The brewing unit (100) includes a main body (102) defining a cavity (200) for receiving multiple types/formats of capsules (120). Further, one or more piercing members (106) are also included in the brewing unit (100). Furthermore, the one or more piercing members (106) are actuated by an actuator (108) to pierce or not to pierce the capsule (120) when the brewing unit (100) is in at least one of corresponding piercing mode/non-piercing mode.

15 Claims, 5 Drawing Sheets

(51) Int. Cl.
*A47J 31/06* (2006.01)
*A47J 31/40* (2006.01)

(58) Field of Classification Search
USPC ...... 99/295, 297, 300, 302 R, 287, 323, 307
See application file for complete search history.

(56) References Cited

U.S. PATENT DOCUMENTS

| | | | |
|---|---|---|---|
| 10,207,860 B2 * | 2/2019 | Mariller | A47J 31/3628 |
| 2010/0037779 A1 * | 2/2010 | Pecci | A47J 31/3628 |
| | | | 99/289 R |
| 2014/0342069 A1 * | 11/2014 | Tinkler | A47J 31/3633 |
| | | | 426/425 |

FOREIGN PATENT DOCUMENTS

| | | |
|---|---|---|
| DE | 202008018417 U1 | 8/2013 |
| EP | 1977667 A2 | 10/2008 |
| EP | 2571405 BI | 4/2014 |
| JP | H04-236923 A | 8/1992 |
| JP | 2012-527294 A | 11/2012 |
| JP | 2013-526355 A | 6/2013 |
| JP | 2013-533034 A | 8/2013 |
| WO | 2010134054 A2 | 11/2010 |
| WO | 2013127694 A1 | 9/2013 |

OTHER PUBLICATIONS

English Translation and Notice of Allowance issued in connection with corresponding application No. 2017116195 dated Sep. 21, 2017, 21 pages.

English Translation and Office Action issued in connection with corresponding application No. 201580054904.5 dated Dec. 4, 2018, 7 pages.

English Translation and Office Action issued in connection with corresponding application No. 201580054904.5 dated Apr. 29, 2019, 8 pages.

* cited by examiner

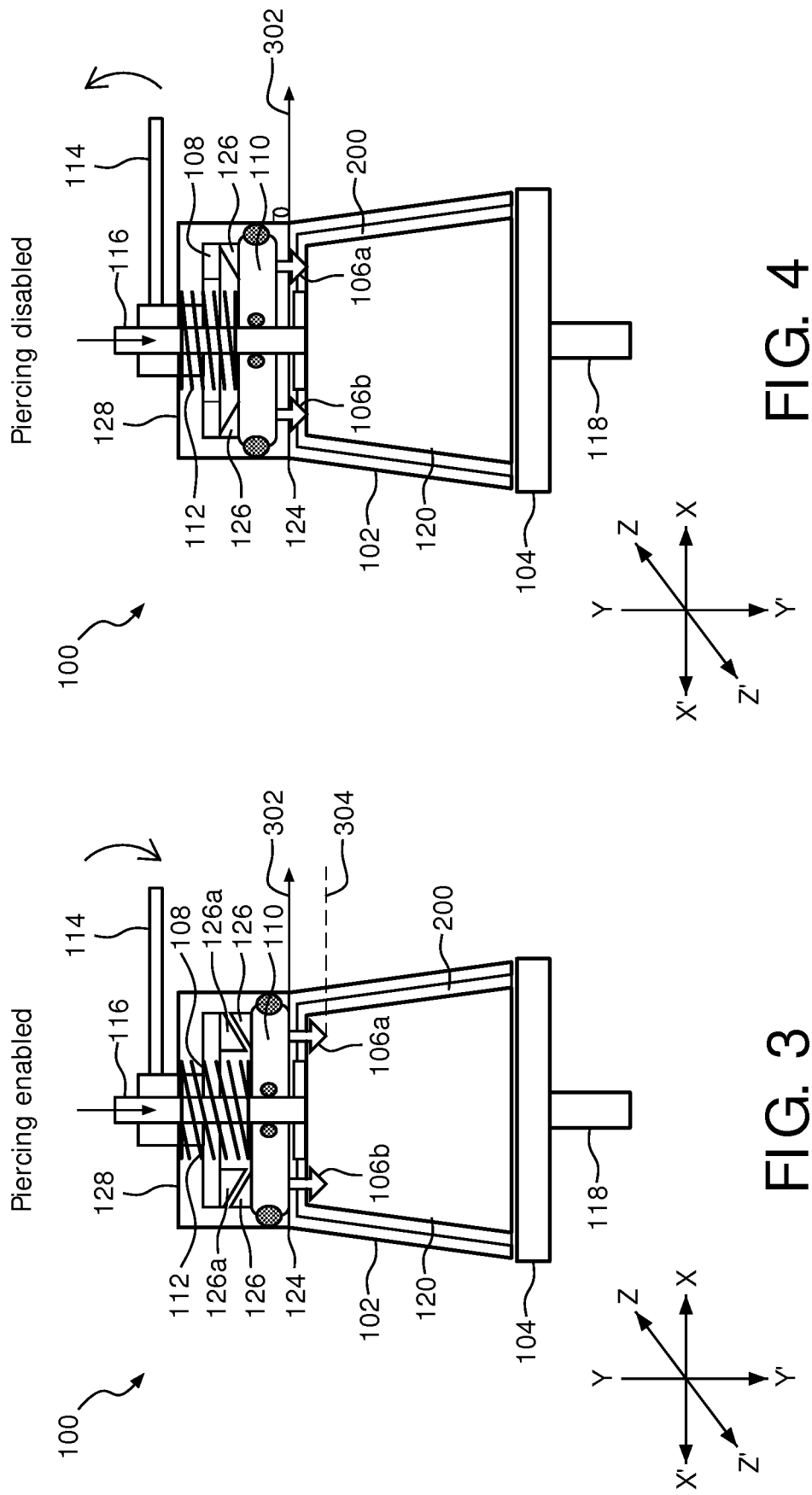

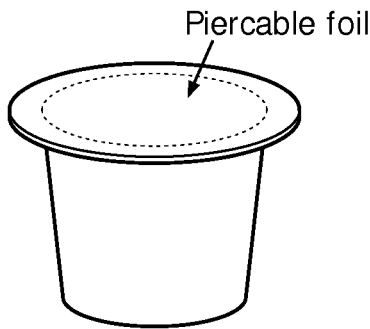
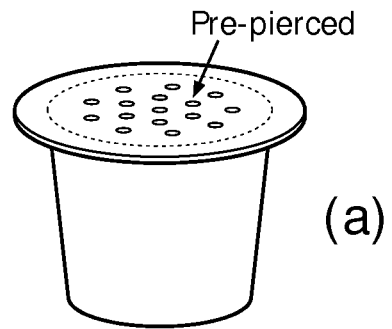
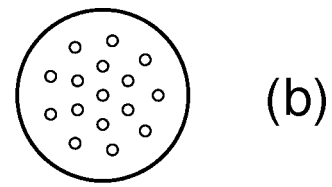
FIG. 5
FIG. 6
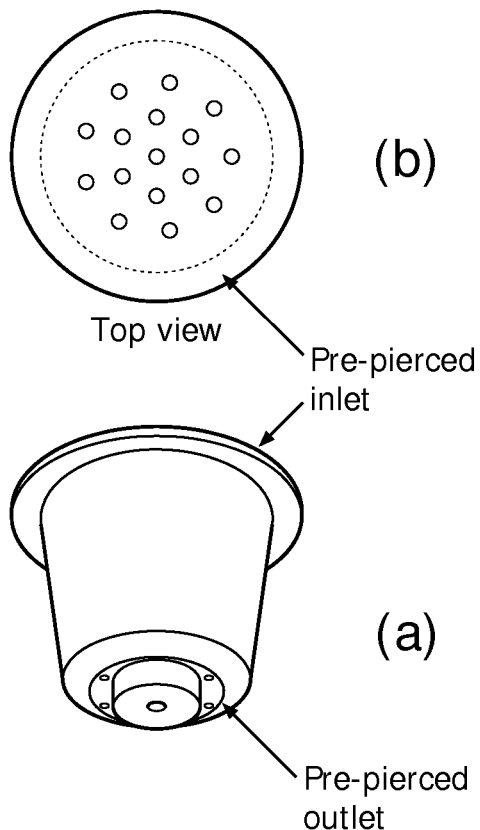
FIG. 7
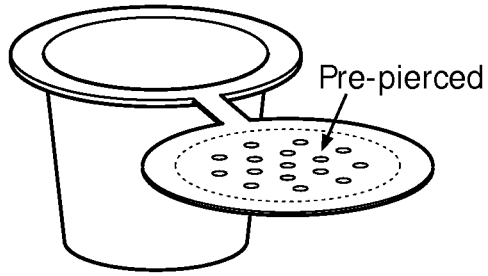
FIG. 8

BREWING UNIT

This application is the U.S. National Phase application under 35 U.S.C. § 371 of International Application No. PCT/EP2015/073439, filed on Oct. 9, 2015, which claims the benefit of International Application No. 14188514.5 filed on Oct. 10, 2014. These applications are hereby incorporated by reference herein.

FIELD OF THE INVENTION

The invention relates to a brewing unit and in particular to a brewing unit for a beverage producing device.

BACKGROUND OF THE INVENTION

Currently, there are multiple types of beverage producing apparatus available in the market. Various examples of the apparatus include but are not limited to coffee machines, juice machines, soda dispensers, and the like. Consumers typically prefer machines that are rather quick in their operation and simultaneously prepare a good quality beverage, for instance coffee. Further, there are multiple machines in the market that use consumables, such as capsules, pods, etc. to give a good cup of coffee with relatively less effort and time involvement from the consumer.

One of the various types of coffee machines requires piercing the consumable, such as a capsule, in order to prepare the coffee. One such coffee machine is disclosed in EP2571405B1. There are other types of coffee machines that use capsules but do not pierce them to brew the coffee. However, if the consumer is not careful in selecting the right type of capsule based on the coffee machine, he may either risk in-cup quality of the brewed coffee or even damage the machine. For instance, he might take capsule that does not require piercing and place it in the machine that operates by piercing the capsule, in such a case there is a high chance that the piercing element as disclosed in EP2571405B1 may be damaged. Alternatively, even if successfully pierced, the in-cup quality of the beverage might be unsatisfactory.

SUMMARY OF THE INVENTION

It is an object of the present invention to provide a brew unit and a beverage producing apparatus provided with a brew unit that are able to produce a beverage irrespective of the type of capsule placed in the brew unit.

According to a first aspect of the invention the object of the present invention is achieved by a brewing unit for a beverage producing device comprising a main body defining a cavity for receiving a capsule of a first type or a capsule of a second type, each type of the capsule containing an extractable food product, wherein the first type of capsule requires piercing to facilitate the preparation of a beverage and the second type of capsule does not require piercing to facilitate the preparation of a beverage, one or more piercing members, a piercing member holder for holding one of more piercing members, and an actuator for actuating the piercing member holder and the one or more piercing members when the unit is brought in a piercing mode for piercing the first type of capsule so as to let a fluid in the capsule to facilitate the preparation of the beverage, wherein the actuator is arranged to bring the unit in a non-piercing mode for disabling the piercing of the second type of capsule.

According to a second aspect of the invention the object is achieved by a beverage producing apparatus provided with the brew unit WO210/134054 discloses a brewing unit according to the pre-amble of claim 1.

The brewing described above will have the functionality of using multiple formats of capsules and can brew the beverage based on the requirements of the capsule. Various examples of formats of capsules include but are not limited to piercable capsules (first type), such as a plastic cup containing the extractable food product covered by a thin piercable foil and capsules that do not require piercing (second type) for preparation of beverage, such as pre-pierced capsules, hard metal reusable/refillable capsules (non-piercable), etc.

There are multiple advantages of the brew unit as described above. Firstly, the consumer is potentially free to use possibly all available formats of capsules. This gives the freedom to the consumer to choose the capsule suitable to his/her needs. For instance, he likes espresso coffee capsule, which requires piercing, of brand A while on the other hand he likes regular coffee capsule, which does not require piercing, of brand B. Secondly, the brew unit as described above avoids an accidental damage to the one or more piercing members. For instance, the piercing members will be damaged if the consumer places a hard metal reusable capsule in the device as disclosed in EP2571405B1. However, given that the brew unit as described above has a non-piercing mode, the situation can now be avoided.

The brew unit further includes an element to open the cavity to enable placing of the capsule in the cavity. The element is further arranged to close the cavity to secure the capsule in the cavity. In an embodiment of the invention, the element is a supporting element that supports the capsule and includes one or more holes in fluid connection with an outlet channel to deliver the prepared/extracted beverage from the capsule. Further, the supporting element has plurality of protrusions to guide/channel the extracted beverage through the holes.

Additionally, the actuator is arranged for selectively actuating/activating the piercing member holder and/or one or more piercing members when the brewing unit is in one of the modes during the brewing cycle of preparation of the beverage. The actuator includes a piercing member holder for holding the one or more piercing members The actuator and the piercing member holder are operatively coupled. In an embodiment of the invention, the actuator and the piercing member holder is operatively coupled by a cam based assembly and a spring. In an embodiment of the invention, the actuator can be activated, preferably with the help of a lever, to bring the piercing members into one of the two modes. For instance, the consumer can choose to operate the lever so that the actuator activates/moves the piercing members into a piercing mode after he has placed a capsule that requires piercing. In another embodiment of the invention, the brew unit/beverage producing device includes a recognition device to detect the type of capsule, i.e. the first type or the second type, and accordingly sends a signal via a control system to the brewing unit or directly to the actuator to either move the piercing members into a piercing mode or not to move the piercing members thereby by activating the non-piercing mode. In yet another embodiment of the invention, the actuator actuates/moves/activates the one or more piercing members when the unit is in the piercing mode irrespective of placement of the capsule in the cavity. In other words, the user/consumer can manually bring the unit into one of the modes without placing the capsule and later placing the capsule to initiate the brewing process. In another embodiment the actuator comprises a piston-cylinder assembly to move the piercing members.

In various embodiments of the invention, in the piercing mode, the actuator is arranged to move the one or more piercing members from a first position to a second position. The first position may be defined as a retracted position of the piercing members. Alternatively, the first position may be defined as the position that enables the easy placing of the capsule into the cavity of the main body without piercing the capsule when the cavity is secured by the element. The second position is defined as the position that is suitable for sufficient piercing of the capsule to facilitate the preparation of the beverage. Similarly, in the non-piercing mode, the actuator is arranged to retain or move the one or more piercing members in the first position.

The brewing unit further includes a fluid inlet for supplying fluid in the capsule of the first/second type for extracting the beverage from the corresponding capsule. Various examples of fluid include but are not limited to water, milk, and a flavoured liquid/syrup. The brew unit further includes an outlet/an outlet channel for delivering the extracted beverage from the capsule.

Though the various examples explained above relate to the field of coffee and coffee machines, it may be appreciated by a person skilled in the art that the other beverage producing devices in the fields, such a juice making, soda preparation may use similar capsules and may/may not require piercing and thus can use/implement a brewing unit, also may be referred to as beverage preparation unit, as described above.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

FIG. 3 shows the brewing unit according to the invention when it is in a piercing mode;

FIG. 4 shows the brewing unit according to the invention, when it is in a non-piercing mode FIG. 5 shows a first type of capsule for use in a brewing unit according to the invention;

FIG. 6a shows a second type of capsule for use in a brewing unit according to the invention;

FIG. 6b shows a bottom view of the second type of capsule for use in a brewing unit according to the invention;

FIG. 7a shows another second type of capsule for use in a brewing unit according to the invention;

FIG. 7b shows top view of the another second type of capsule for use in a brewing unit according to the invention;

FIG. 8 shows yet another second type of capsule for use in a brewing unit according to the invention.

DETAILED DESCRIPTION OF THE DRAWINGS

Figure 1:
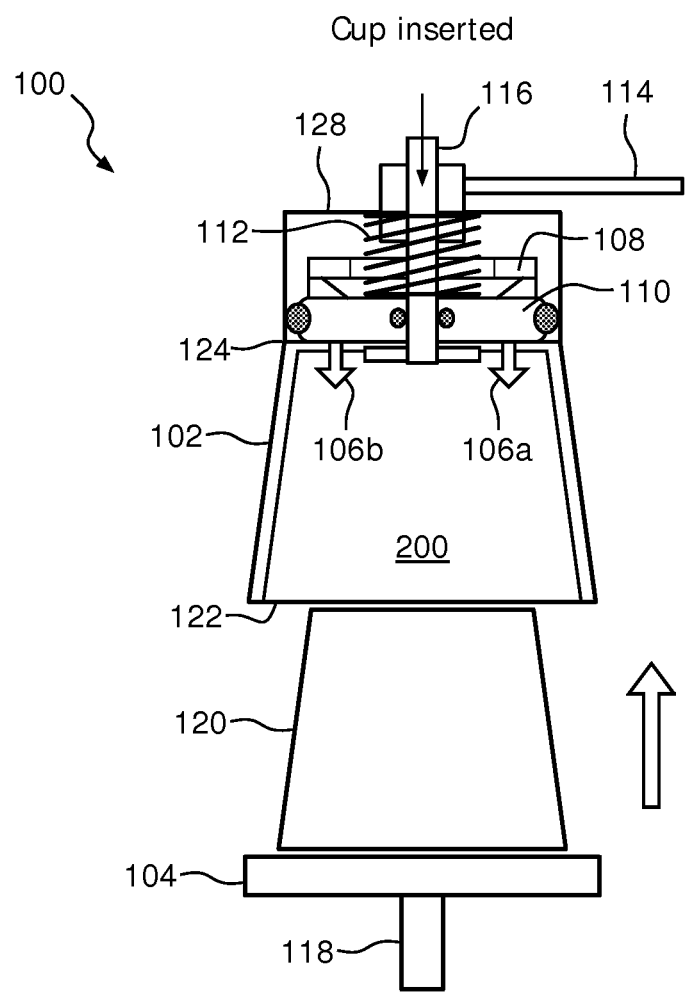
FIG. 1 shows an embodiment of a brewing unit according to the invention.

FIG. 1 shows an embodiment of a brewing unit 100 (also may be referred to as a brew chamber) according to the invention. Brewing unit 100 includes a main body 102, an element 104, one or more piercing members 106, such as a piercing member 106a and a piercing member 106b, an actuator 108, a piercing member holder 110, at least one spring 112, a lever 114, a fluid inlet channel 116 and an outlet channel 118.

The main body 102 defines a cavity 200 for receiving a capsule 120 (also may be referred to as a cup). Main body 102 can also be referred to as a capsule holder. It may be understood by a person skilled in the art that geometry of the cavity 200 will be designed to accommodate the corresponding capsule 120. The main body 102 includes an open end 122 and a closed end 124. The closed end 124 supports a piercing assembly including one or more piercing members 106, the actuator 108, the piercing member holder 110, the spring 112, and the lever 114. The actuator 108, piercing member holder 110 and the spring 112 are enclosed in an enclosure 128. Further, the main body 102 defines space for the inlet channel 116.

The piercing member(s) 106 are used to pierce the capsule 120 to facilitate the inlet of a fluid from the inlet channel 116 in the capsule 120 for preparation of the beverage. Various types of piercing member 106 can be used, such as needle like member, sharp flat knife like member, etc. The piercing member(s) 106 move through one or more holes (not depicted in the figures) on the closed end 124 to move inside and outside of the main body 102. The piercing members 106 are held on the piercing member holder 110. Further, piercing member holder 110 is moved by an actuator 108 and spring 112, thereby, moving the piercing members 106. In an embodiment of the invention, the actuator 108 is an actuator plate 108. However, it may be understood by the person skilled in the art that geometries other than a plate can be used as the actuator 108.

Furthermore, the actuator 108 moves the piercing member holder 110, thereby the piercing members 106, from a first position to a second position in response to the operation of the lever 114 (later explained in conjunction with FIG. 3 and FIG. 4). Though the actuator 108 is actuated/activated/moved with the help of the lever 114, it may be understood by a person skilled in the art that other actuation techniques such as hydraulic, electronic and the like may also be used either as a standalone technique or in a combination.

The closed end 124 also defines a space for inlet channel 116 in order to supply liquid to the capsule 120 for preparation of a beverage. In another embodiment of the invention, the piercing members 106 may include the inlet channel 116 to deliver the liquid inside the capsule 120.

Figure 1A:
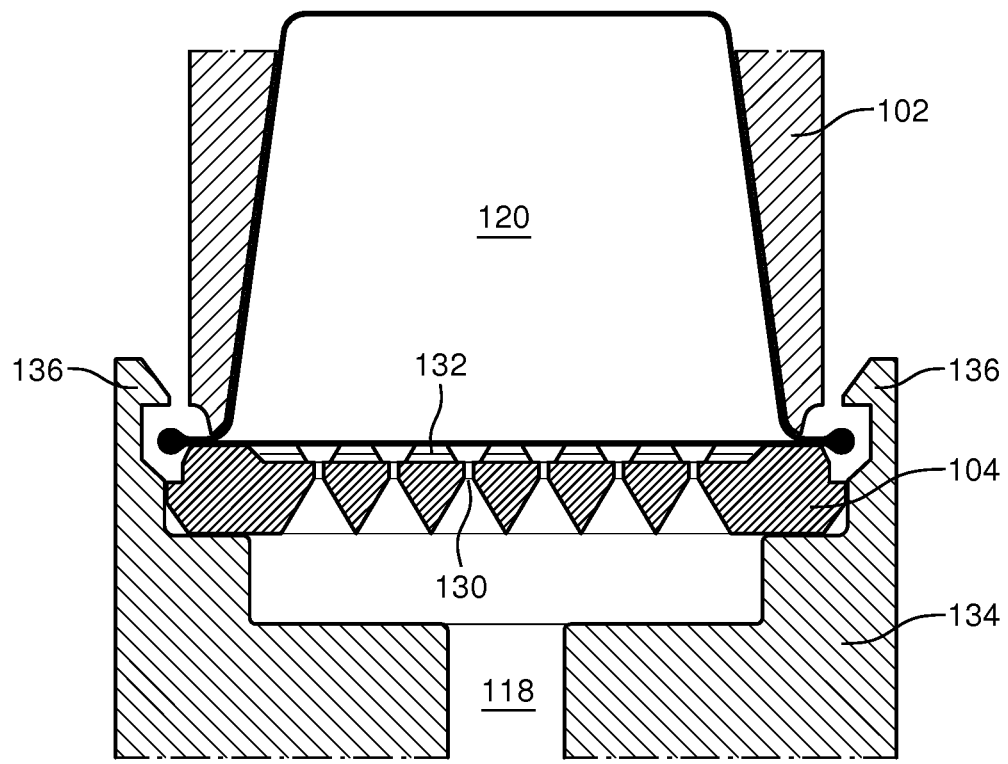
FIG. 1a shows a detailed view of a supporting element of the brewing unit according to the invention.

The distal end from the closed end 124 as described above, the main body 102 includes the open end 122. The open end 122 can be sealed/closed by the element 104. In other words, the element 104 secures the capsule 120 in the cavity 200. The element 104 can be further elaborated in conjunction with FIG. 1a. In an embodiment of the invention, the element 104 also may be referred to as a supporting element 104 because it supports the capsule 120. The supporting element 104 further includes one or more holes 130 to let the beverage out through the outlet channel 118. In other words, the one or more holes 130 in the supporting element 104 are in fluid connection with the outlet channel 118. The supporting element 104 further includes a plurality of protrusions 132 to guide the extracted beverage through the holes 130. Further in an advantageous embodiment of the invention, the protrusions 132 can also break the foil of the first type of capsule, thereby enabling the flow of the extracted beverage through the holes 130 to the outlet channel 118. Furthermore, the supporting element 104 is surrounded by a covering member 134 that includes one or more retaining members 136 to retain the capsule 120 when the main body 102 is opened to remove the capsule 120. This helps in accidental lifting of the capsule 120 by the opening of the main body 102.

The operation of the brewing unit will be described in detail in conjunction with FIG. 2, FIG. 3 and FIG. 4.

Figure 2:
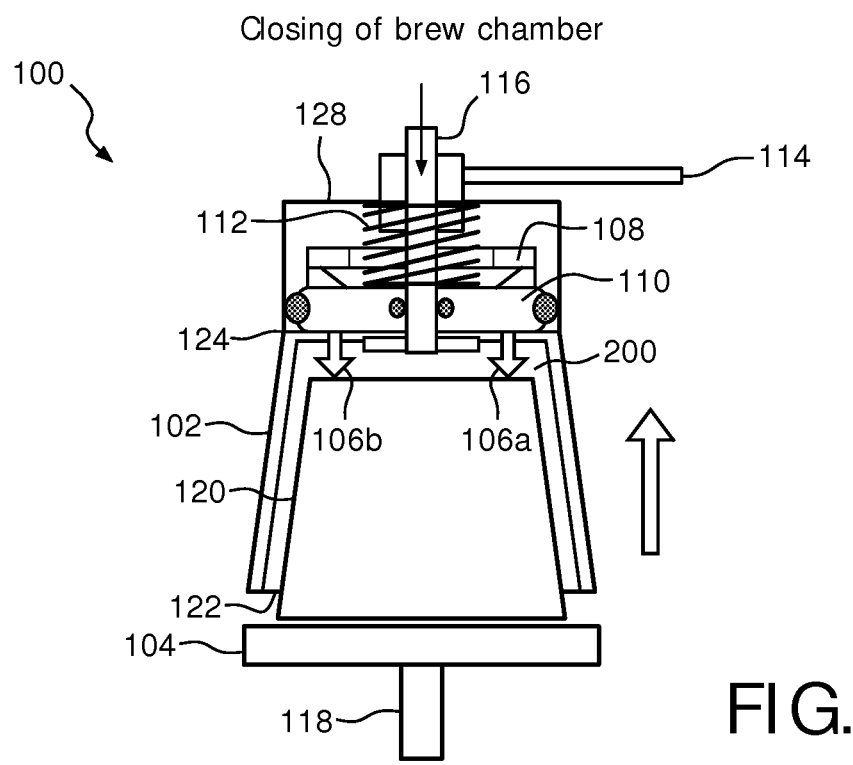
FIG. 2 shows the placement of the capsule in the brewing unit according to the invention.

FIG. 2 shows the placement of the capsule 120 in the brewing unit 100 according to an embodiment of the invention. In operation, the capsule 120 is placed inside the cavity 200 of the main body 102 from the open end 122. Thereafter, the element 104 closes the cavity 200 to secure the capsule 120 inside the cavity 200. It may be understood by the person skilled in the art, the same element 104 is later used to open the main body 102 to remove/replace the capsule 120. The closing of the cavity 200 is typically performed manually. However, there can be automated means to close the cavity 200 once the capsule 120 is received in the cavity 200.

In an embodiment of the invention, closing of the cavity 200 can be performed by moving the element 104 towards the main body 102 (as depicted by arrow). In another embodiment of the invention, closing of the cavity 200 can be performed by moving the main body 102 towards the element 104.

FIG. 3 shows the brewing unit 100 according to an embodiment of the invention in a piercing mode. As explained earlier, the capsule 120 can be of various types, such as one which require piercing (FIG. 5) and one which are pre-pierced (FIG. 6a and FIG. 6b) or pre-pierced reusable hard metal (FIG. 7a and FIG. 7b) or plastic reusable capsules (FIG. 8) and thus essentially do not require piercing. In the current figure the piercing mode is further elaborated and thus capsule 120 used in this mode is a first type of capsule, such as depicted in FIG. 5.

Before placing the capsule 120 in the cavity 200, the brewing unit 100 can be brought into the piercing mode. In this mode, the actuator 108 moves the piercing member holder 110, thereby the piercing members 106, from a first position 302 to a second position 304. The first position 302 may be defined as a retracted position of the piercing members 106. Alternatively, the first position 302 may be defined as the position that enables the easy placing of the capsule 120 into the cavity 200 of the main body 102 without piercing the capsule 120 when the cavity 200 is sealed by the element 104. The second position 304 is defined as the position that is suitable for sufficient piercing of the capsule 120 to facilitate the preparation of the beverage.

In an embodiment of the invention, the piercing members 106 are operated with the help of the lever 114. The operation of the lever 114 actuates/activates the actuator 108 and moves the piercing member 106 from the first position 302 to the second position 304. In an embodiment of the invention, the lever 114 can be turned clockwise direction to activate (or switch to) the piercing mode. Once the lever 114 is rotated, the actuator 108 rotates and thereby moves the piercing member holder 110 in the Y' direction. To further elaborate the piercing member holder 110 and actuator 108 can be operatively coupled by a standard cam, preferably cylindrical cam, based mechanism. For instance, the piercing member holder 110 includes protrusions 126 that are movably arranged in the chamfered surface 126a of the actuator 108. Due to the rotation of the actuator 108, these protrusions 126 move along the chamfered surface 126a and lock the piercing member holder 110 with respect to the actuator 108 at the pre-determined position (in the direction of Y') on the chamfered surface 126a. In this arrangement, like in a typical cam based assembly, the actuator 108 represents a cam and the protrusions 126 on the piercing member holder 110 represents a follower, thereby translating rotational movement to a liner movement.

Further, the piercing member holder 110 is retained at the locked position by the simultaneous decompression of the spring 112 attached to the internal wall of the enclosure 128. The movement of the piercing member holder 110 has now created space between the actuator 108 and piercing member holder 110, the spring 112 further pushes the piercing member holder 110 in Y', thereby moving the piercing members 106 in Y' to the second position 304.

It may be appreciated by a person skilled in the art that the cam based assembly is only one way to achieve the displacement of piercing member holder 110. In another embodiment of the invention, the lever 114 can be moved in direction of Y/Y' to activate/deactivate the modes. In yet another embodiment of the invention, the activation into one of the modes can be arranged by means of a push button with the help of hydraulic means, electronic means, or in combination. The actuator may for example comprise a piston and a cylinder. Preferably such hydraulic system is connectable to the hydraulic circuit of a coffee machine. The piston is connected to the piercing members.

Thus, in operation, the user/consumer brings the brewing unit 100 in the piercing mode. Thereafter, the user places the capsule 120 in the cavity 200 and the element 104 closes the cavity 200 and secures the capsule 120. In the process of securing the capsule 120, the capsule 120 is pushed towards the piercing members 106 to an extent that piercing members 106 move inside/pierce the capsule 120. It may be understood that since the piercing members 106 are in the locked state, they cannot retract from the second position 304 and hence will move in to the capsule 120, thereby piercing the capsule 120.

Once the capsule 120 is pierced, the fluid can be supplied through the inlet channel 116 inside the capsule 120. Thereafter, the brewed/prepared beverage can be collected from the outlet channel 118 integrally connected to the element 104. As explained earlier, the element 104 includes one or more holes 130 fluidly connected to the outlet channel 118. In another embodiment of the invention, the element 104 and outlet channel 118 need not be fluidly connected. In such an embodiment, the element 104 only enables the opening/closing and securing of capsule 120 and the outlet channel 118 is separate from the element 104.

In another embodiment of the invention, in the piercing mode, though the piercing member holder 110 is locked, arrangements can be made using the spring 112 so that piercing member 106 can move in Y direction. This is in particular for a scenario when a capsule 120 of second type as disclosed in FIG. 7 and FIG. 8 is used. This avoids accidental damage of piercing members 106 if such capsules are placed while the piercing member holder 110 is in the piercing mode.

FIG. 4 shows the brewing unit 100 in a non-piercing mode according to the invention. In the current figure the non-piercing mode is further elaborated and thus capsule 120 used in this mode is a second type of capsule, such as depicted in FIG. 6a, FIG. 6b, FIG. 7a, FIG. 7b and FIG. 8.

Before placing the capsule 120 in the cavity 200, the brewing unit 100 can be brought into the non-piercing mode. In this mode, the actuator 108 is arranged to keep/retain the one or more piercing members 106 in the first position 302. In continuation to the explanation earlier, the lever 114 can be rotated anticlockwise direction to activate (or switch to)

the non-piercing mode. In this mode, the protrusions 126 are disengaged from the locked position and move along the chamfered surface 126a of the actuator 108 to move the piercing member holder 110 in Y, thereby moving the piercing members 106 to the first position 302. Further, the displacement of the piercing member holder 110 in direction of Y also compresses the spring 112.

As explained earlier, the first position 302 is chosen in such a way that piercing member 106 does not pierce the capsule 120 placed in the cavity 200. The capsule 120 is placed in the cavity 200, and the element 104 secures the capsule 120 in the cavity 200. Given that the piercing members 106 are in the first position 302, the movement of the capsule 120 towards the piercing members 106 does not lead to piercing of the capsule 120 in process of securing the capsule 120. In another embodiment of the invention, since the chamfered cams are disengaged, the piercing member 106 retracts as the placed capsule 120 pushes back the piercing member 106, thereby the piercing member holder 110, to the first position 302 due to the closing of the cavity 200 by the element 104. The spring forces are chosen in such a way that the piercing member 106 does not pierce the capsule 120 while it pushes the piercing member holder 110 to the first position 302.

Though the above embodiment has been explained with activating the brewing unit 100 into one of the modes before the placement of the capsule 120, it is equally possible to bring the brewing unit 100 into one of the modes after placing the capsule 120 in the main body 102.

In yet another embodiment of the invention, the brewing unit 100 can include a recognition device (not depicted in the figures) to recognize the type of capsule 120 an accordingly move the piercing members 106 into one of the two modes. In such an embodiment, once the type of the capsule 120 is recognized, thereafter, the actuator 108 can move the piercing member holder 110 into one of the two modes, i.e. piercing mode and non-piercing mode.

Further, the above figures are explained with piercing/non-piercing at the inlet side of the capsule 120 for infusing the liquid into the capsule 120. It may be apparent to a person skilled in the art that similar selective piercing/non-piercing can be arranged at the outlet side of the capsule 120 based on its design. For example, if the outlet side of the capsule 120 is liquid pervious then there is no requirement to pierce the capsule 120. On the other hand if the outlet side is also similar to the inlet side of the capsule 120, then piercing may be necessary to let the prepared beverage flow out the capsule 120 in order to flow out of the outlet channel 118.

Figure 9:
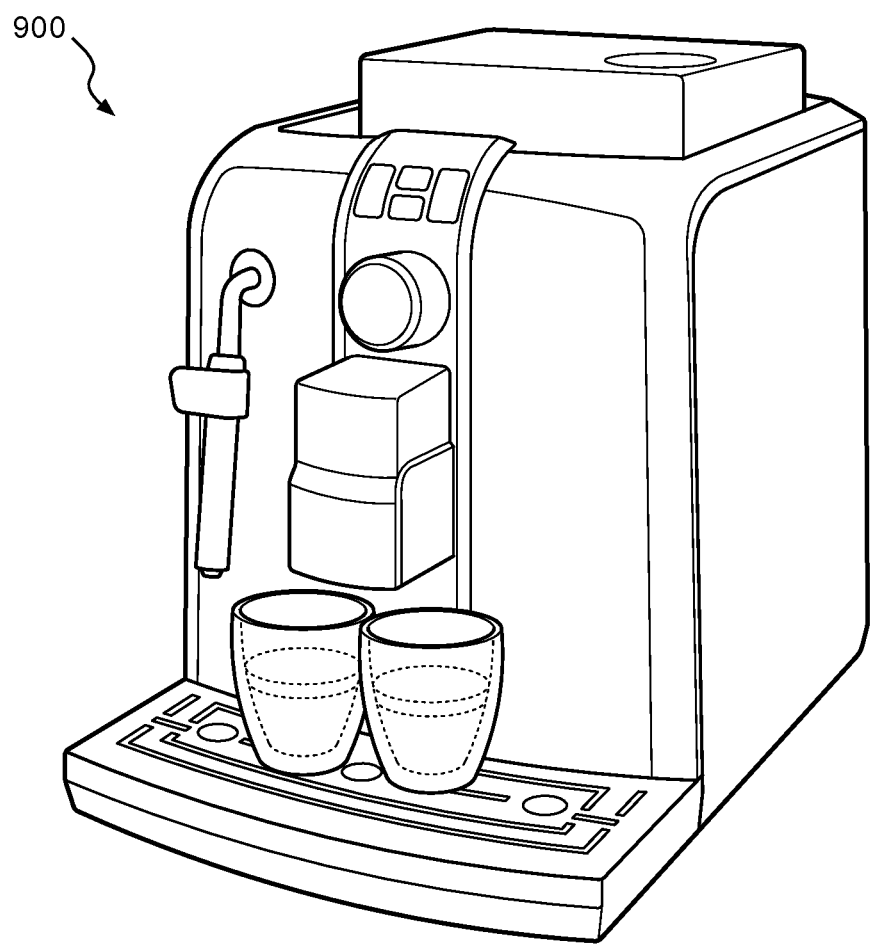
FIG. 9 shows a beverage producing device according to the invention.

The brewing unit 100 as described above is included in a beverage producing device 900 (as depicted in FIG. 9). In an embodiment of the invention, the beverage producing device 900 is a coffee machine. In another embodiment of the invention, the beverage producing device is a juice machine or a soda dispensing machine working concentrated syrup enclosed in the capsules.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The invention claimed is:

1. A brewing unit for a beverage producing device comprising:
    a main body defining a cavity for receiving a capsule of a first type or a capsule of a second type, each type of the capsule containing an extractable food product, wherein the first type of capsule requires piercing to facilitate a preparation of a beverage and the second type of capsule does not require piercing to facilitate the preparation of the beverage;
    one or more piercing members;
    a piercing member holder for holding the one or more piercing members; and
    an actuator for actuating the piercing member holder and the one or more piercing members when the brewing unit is brought in a piercing mode for piercing the first type of capsule, wherein the actuator is arranged to bring the brewing unit in a non-piercing mode for disabling the piercing of the second type of capsule.

2. The brewing unit according to claim 1, wherein the actuator is arranged for selectively actuating the piercing member holder in one of the piercing mode and the non-piercing mode before or after the main body receives the capsule of the first/second type.

3. The brewing unit according to claim 1, further comprising an element configured to:
    open the cavity to enable placing of the capsule, of the first/second type, in the cavity; and
    close the cavity to secure the capsule, of the first/second type, in the cavity.

4. The brewing unit according to claim 1, wherein the actuator and the piercing member holder are operatively coupled by a cam-based assembly and a spring.

5. The brewing unit according to claim 1, further comprising a lever for activating the actuator in one of the piercing mode and the non-piercing mode.

6. The brewing unit according to claim 1, further comprising a recognition device to recognize the capsule of the first/second type, wherein the actuator is arranged for selectively actuating the one or more piercing members in one of the piercing mode or the non-piercing mode based on the recognition.

7. The brewing unit according to claim 1, further comprising a fluid inlet for supplying fluid in the capsule of the first/second type for extracting the beverage from the corresponding capsule.

8. The brewing unit according to claim 1, wherein in the piercing mode, the actuator is arranged to move the one or more piercing members from a first position to a second position.

9. The brewing unit according to claim 1, wherein in the non-piercing mode, the actuator is arranged to retain or move the one or more piercing members in a first position.

10. The brewing unit according to claim 1, wherein the actuator comprises a piston-cylinder assembly, and wherein the piercing member holder is connected to a piston of the piston-cylinder assembly.

11. A beverage producing device comprising the brewing unit in claim 1.

12. A brewing unit for a beverage producing device comprising:
- a main body defining a cavity for receiving a capsule of a first type or a capsule of a second type, each type of the capsule containing an extractable food product, wherein the first type of capsule requires piercing to facilitate a preparation of a beverage and the second type of capsule does not require piercing to facilitate the preparation of the beverage;
- one or more piercing members;
- a piercing member holder for holding the one or more piercing members; and
- an actuator for actuating the piercing member holder and the one or more piercing members, wherein the actuator is arranged to switch between:
  - a piercing mode for piercing the first type of capsule, wherein in the piercing mode the actuator is configured to move the one or more piercing members from a first position to a second position, and
  - a non-piercing mode for disabling the piercing of the second type of capsule, wherein in the non-piercing mode the actuator is configured to move or retain the one or more piercing members in the first position.

13. The brewing unit according to claim 3, wherein the element is a supporting element comprising one or more holes in fluid connection with an outlet channel.

14. The brewing unit according to claim 13, wherein the supporting element has a plurality of protrusions to guide an extracted beverage through the one or more holes.

15. The brewing unit according to claim 5, wherein the lever is arranged to manually activate the actuator.

* * * * *